United States Patent [19]

Itoh et al.

[11] Patent Number: 5,112,593
[45] Date of Patent: May 12, 1992

[54] PRODUCTION PROCESS OF CHLORINE

[75] Inventors: Hiroyuki Itoh; Yoshitsugu Kono; Isao Kikuchi; Shinji Takenaka, all of Ohmuta; Masanobu Ajioka, Yokohama, all of Japan

[73] Assignee: Mitsui Toatsu Chemicals, Incorporated, Tokyo, Japan

[21] Appl. No.: 595,651

[22] Filed: Oct. 9, 1990

Related U.S. Application Data

[63] Continuation-in-part of Ser. No. 317,566, Mar. 1, 1989, abandoned.

[30] Foreign Application Priority Data

Mar. 1, 1988 [JP] Japan .................................. 63-045785

[51] Int. Cl.⁵ .............................................. C01B 7/04
[52] U.S. Cl. .......................... 423/502; 423/DIG. 16; 422/139; 422/142
[58] Field of Search ....................... 423/502, DIG. 16; 422/139, 142

[56] References Cited

U.S. PATENT DOCUMENTS

| | | | |
|---|---|---|---|
| 2,893,851 | 7/1959 | Georgian | 422/139 |
| 4,803,065 | 2/1989 | Itoh et al. | 423/502 |
| 4,956,169 | 9/1990 | Ajioka et al. | 423/502 |

FOREIGN PATENT DOCUMENTS

| | | | |
|---|---|---|---|
| 251731 | 1/1988 | European Pat. Off. | |
| 2197302 | 9/1987 | Japan | 423/502 |
| 676667 | 7/1952 | United Kingdom | |

OTHER PUBLICATIONS

Chemical Abstracts, vol. 107, 136915n, Columbus, Ohio, U.S., No. 16, Oct. 19, 1987, p. 156.
Chemical Abstracts, vol. 107, No. 26, Dec. 28, 1987, p. 144, No. 239268h, Columbus, Ohio, U.S.
Search Report for European Patent Application 89302043.8.

Primary Examiner—John Niebling
Assistant Examiner—Brian M. Bolam
Attorney, Agent, or Firm—Oblon, Spivak, McClelland, Maier & Neustadt

[57] ABSTRACT

Chlorine is produced by reacting hydrogen chloride and oxygen in the presence of a catalyst composed of a chromium oxide as a principal component. The reaction is carried out in a fluidized bed reactor equipped at vertical intervals not greater than 100 cm with a plurality of perforated horizontal plates having a perforation rate of 10-60% in a reaction zone in which the catalyst is fluidized in operation. The reaction zone is above a gas diffuser plate.

3 Claims, 1 Drawing Sheet

PRODUCTION PROCESS OF CHLORINE

This application is a Continuation-In-Part of application Ser. No. 07/317,566, filed on Mar. 1, 1989, now abandoned.

BACKGROUND OF THE INVENTION

1) Field of the Invention

This invention relates to a production process of chlorine, in which a fluidized bed reactor is used. More specifically, this invention is concerned with a process for producing chlorine by oxidizing hydrogen chloride gas with an oxygen-bearing gas in a fluidized bed reactor equipped with perforated plates.

2) Description of the Related Art

The oxidative reaction of hydrogen chloride for the production of chlorine has been known as the Deacon process for many years. Numerous catalysts have heretofore been proposed for this reaction (G.B. Patent Nos. 584,790, 676,667 and 846,832).

A variety of processes have also been proposed for the preparation of a catalyst which is composed of a chromium oxide as a principal component and is useful in a production process of chlorine by oxidation of hydrogen chloride (Japanese Patent Application Laid-Open Nos. 136902/1986, 275104/1986 and 113701/1987; Japanese Patent Application Nos. 112592/1986 and 148055/1986).

In addition, a process has also been proposed for the production of chlorine by oxidation of hydrogen chloride in the presence of such a catalyst in a fluidized reactor (Japanese Patent Application No. 157812/1987).

A fluidized bed reactor generally has a gas diffuser plate in a bottom part thereof, and a catalyst is placed above the gas diffuser plate. A feed gas mixture is charged upward through the gas diffuser plate, so that the feed gas mixture is brought into contact with the catalyst to induce a chemical reaction.

Because of the structure mentioned above, the catalyst layer takes the form of a fluidized layer and the feed gas mixture is brought as bubbles into contact with the catalyst to undergo the reaction. However, the bubbles join together into greater bubbles as they ascend through the fluidized layer. As a result, the efficiency of contact is lowered in an upper part of the catalyst layer. So long as the catalyst has extremely high activity, the reaction can ordinarily be brought to completion by simply mixing the feed gas mixture with the catalyst and the efficiency of contact between the feed gas mixture and the catalyst would not affect the yield of the reaction.

A reduced efficiency of contact will however lead to a lowered yield where the reaction velocity is slow.

When producing chlorine by oxidation of hydrogen chloride in the presence of a catalyst as described above, the catalyst has high activity but its bulk density is relatively high. The catalyst therefore tends to promote the joining of bubbles into greater bubbles. This joining of bubbles inevitably results in a lowered efficiency of contact between the catalyst and the feed gas mixture. As a result, the conversion of hydrogen chloride into chlorine is lowered. The efficiency of facilities is reduced correspondingly, leading to a substantial loss in economy.

SUMMARY OF THE INVENTION

An object of this invention is to provide a process for the industrial production of chlorine by oxidation of hydrogen chloride gas in a fluidized bed reactor which can prevent the introduced hydrogen chloride gas from forming large bubbles in a fluidized bed and hence can avoid any reduction in the efficiency of its contact with a catalyst.

It is another object of the present invention to provide a process for the production of chlorine by the oxidation of hydrogen chloride gas in the presence of a catalyst in a fluidized bed reactor which results in a reduction in the erosion rate of the reactor and a reduction in the rate of deterioration of the catalyst.

With a view toward solving the problems which arise upon production of chlorine by oxidation of hydrogen chloride in such a fluidized bed reactor, the present inventors have carried out an extensive investigation. As a result, it has been found that the provision of perforated plates in a zone, in which a catalyst is fluidized to effect the reaction, above a gas diffuser plate in the reactor can reduce the joining of bubbles into greater ones and thus can improve the conversion of hydrogen chloride into chlorine, leading to completion of this invention.

In one aspect of this invention, there is thus provided a process for producing chlorine by reacting hydrogen chloride and oxygen in the presence of a catalyst composed of a chromium oxide as a principal component. The process comprises using a fluidized bed reactor equipped at vertical intervals not greater than 100 cm with a plurality of perforated horizontal plates having a perforation rate of 10-60% in a reaction zone in which the catalyst is fluidized in operation. The reaction zone is above a gas diffuser plate.

The process of this invention has made it possible to improve the conversion of hydrogen chloride into chlorine in a process for producing chlorine by reacting hydrogen chloride and oxygen in the presence of a catalyst composed of a chromium oxide as a principal component. Chlorine can therefore be produced with a high efficiency, thereby enhancing the industrial value of the catalyst further.

DETAILED DESCRIPTION OF THE INVENTION

Figure 1:
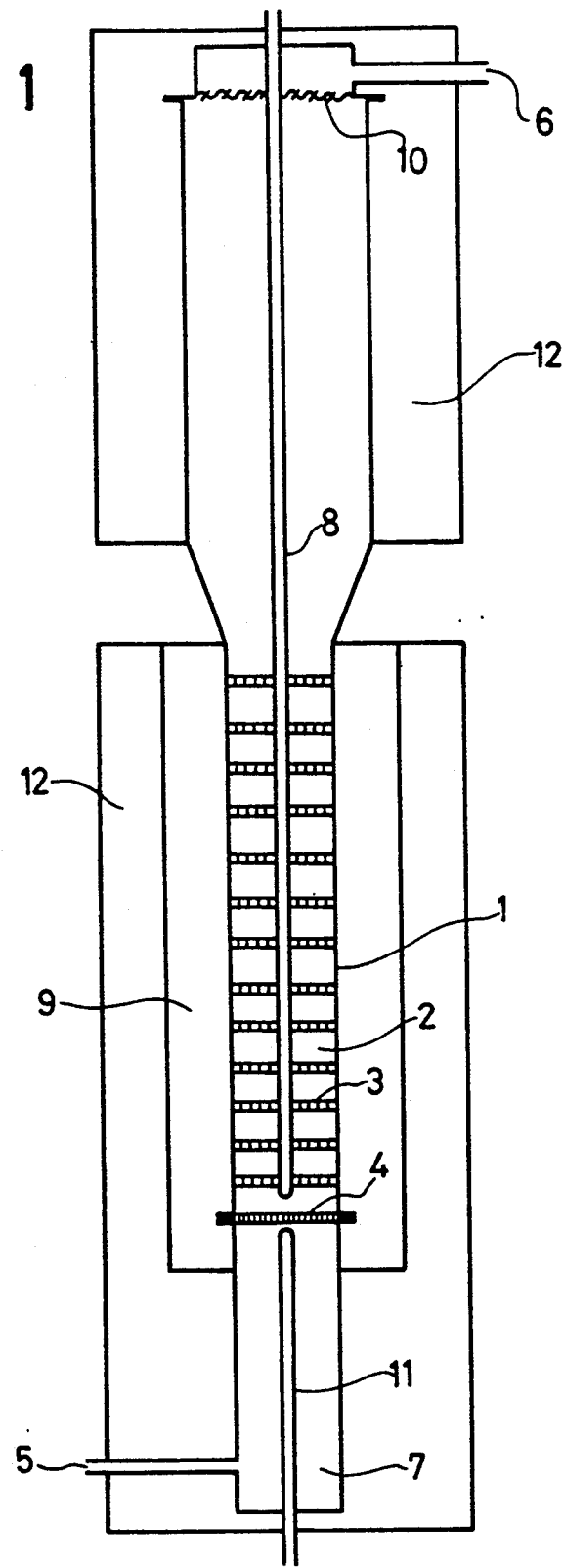
FIG. 1 is a cross-sectional view of a fluidized bed reactor used in Example.

Preferably, the chromium oxide catalyst employed in the process of this invention is composed principally of chromia ($Cr_2O_3$). It can be prepared by either the precipitation process or the immersion process.

When the precipitation process is relied upon, chromium hydroxide synthesized as a precipitate from a chromium (III) salt, namely, a chromic salt and a basic compound is calcined at temperatures lower than 800° C. The resulting chromium oxide is comminuted into particles. The particles are usually added with silicon oxide as a binder, thereby forming a slurry. The slurry is thereafter granulated and dried by means of a spray drier or the like. As an alternative, a chromium hydroxide slurry, which has been prepared by adding a basic compound to a chromic salt and forming chromium hydroxide as a precipitate, is added with silicon oxide, followed by granulation, drying and calcination.

For example, chromium nitrate or chromium chloride is used as a chromic salt, while ammonia is employed as a neutralizing agent for obtaining chromium hydroxide as a precipitate. The resultant chromium hydroxide is then calcined at temperatures lower than 800° C. The thus-obtained chromium hydroxide is then shaped as a principal component, using silicon oxide as a binder.

In the immersion process, for example, silicon oxide having a porosity of 0.3–1.5 cc/g preferably is immersed as a carrier in an aqueous solution of a water-soluble chromium salt or chromic anhydride ($CrO_3$) so that the chromium salt or chromic anhydride is borne on the carrier. After drying the carrier, it is calcined for 1–2 hours at 300°–400° C. This procedure is repeated several times until chromia is borne in a proportion of 20–80 wt. % or about 75 wt. % of the carrier. The thus-prepared carrier is thereafter calcined further at 400°–600° C. for several hours.

Using a catalyst prepared in a manner as described above, hydrogen chloride and oxygen are reacted in a fluidized bed reactor, preferably, under the following conditions:

(1) The average particle size of the catalyst is 40–100 μm, with the maximum particle size not exceeding 200 μm and those having a particle size of 40 μm or smaller accounting for at least 10 wt. %. The catalyst is used in an amount such that the height of the catalyst layer is at least 0.1 m when the reactor is not in operation.

(2) The molar ratio of oxygen to hydrogen chloride in the feed gas is at least 0.25.

(3) The feed gas is charged at an hourly rate of 200–1800 Nl, in terms of hydrogen chloride, per kg of the catalyst used.

(4) The superficial velocity, at which the feed gas flows through the reactor, is maintained at 0.1–1.0 m/sec.

(5) The reaction temperature and pressure are set at 350°–450° C. and normal pressure or higher, respectively.

It is desirable to use a material, whose iron content is not higher than 1 wt. %, for the construction of at least gas-contacting portions of the fluidized bed reactor to be employed in the practice of the process of this invention. Perforated horizontal plates, which are made of a material similar to the aforementioned material, are provided at vertical intervals not greater than 100 cm above a gas diffuser plate through which hydrogen chloride and oxygen are charged into the reaction bed.

Any gas diffuser plate may be used, so long as it can finely divide and diffuse the gaseous mixture of hydrogen chloride and oxygen.

Perforated plates useful in the practice of the process of this invention have a structure such that many perforations of 20 cm² or smaller are formed at the same pitch. Their perforation rate is determined by the number of perforations and the pitch. Perforation rate is defined by the following equation:

$$\text{Perforation rate (\%)} = \frac{\text{(Total cross-sectional area of perforations)}}{\text{Cross-sectional area of reactor}} \times 100$$

In this invention, the process is conducted generally at a perforation rate of 10–60%.

As the perforation rate increases, the reactor becomes closer to a state equipped with no perforated plates. Perforation rates greater than 60% are substantially ineffective to improve the conversion. If the perforation rate is smaller than 10% on the other hand, most of the catalyst is blown upward beyond the uppermost perforated plate in operation. Accordingly, only a small portion of the catalyst remains in the area of the perforated plates, whereby the conversion is lowered.

The area of each perforation of the perforated plates may desirably be 20 cm² or smaller. If the area of each perforation is large, the effect to prevent joining of bubbles is reduced. However, if the diameter of each perforation of the perforated plates, namely, the diameter calculated under the assumption that each perforation is circular is either substantially equal to or smaller than the thickness of the perforated plates, the perforated plates interfere with the movement of the catalyst thereby to cause localization of the catalyst as in the use of a small perforation rate.

The shape of perforations may desirably be circular in view of the ease in their formation and the strength of the perforated plates. Other shapes are also usable without any particular problem. So long as the perforation rate falls within the above-described range, perforated plates with some of their perforations having an area greater than 20 cm² can still bring about similar effects provided that these perforations are not many.

No particular limitation is imposed on the thickness of the perforated plates, so long as they have strength sufficient to withstand usual operation after perforations are formed at a predetermined perforation rate.

The smaller the interval between the gas diffuser plate and its adjacent perforated plate and the intervals between the perforated plates, the more effective. These intervals may desirably range from 4 cm to 1 m. It is practically difficult to construct scale reactors with intervals smaller than 4 cm from the industrial standpoint. As such intervals become greater beyond 1 m, perforated plates gradually become less effective for the improvement of the conversion. When the intervals increase further, the resulting reactor would not be different from that unequipped with perforated plates.

The number of perforated plates can be determined suitably in such a way that they are arranged at the above-mentioned intervals in a zone of the reactor, where the catalyst is fluidized.

A further advantage of the present method is that the use of a perforated plate reactor results in a reduced rate of erosion of the reactor and a reduced rate of deterioration of the catalyst. Thus, when a reactor of nickel is used, the present process results in a reduced rate of incorporation of nickel into the catalyst.

The present invention will hereinafter be described in further detail by the following Examples and Comparative Examples.

EXAMPLE 1

A fluidized bed reactor used in this Example is shown in FIG. 1.

Chromium nitrate (16.9 kg) was dissolved in deionized water (750 l), followed by a dropwise addition of 25% aqueous ammonia (31.3 kg) over 6 hours under thorough stirring.

Deionized water was added to the resultant precipitate slurry to dilute the latter to 1500 l. After allowing the thus-diluted slurry to stand overnight, it was subjected repeatedly to decantation to wash the precipitate. Colloidal silica was then added in an amount equal to 25% of the total weight after calcination. The slurry mixture was dried by a spray drier, and the resulting particulate powder was calcined at 600° C. for 3 hours in an air atmosphere.

A fine particulate catalyst thus obtained was thereafter sifted through JIS standard sieves, thereby obtaining a catalyst having an average particle size (median size) of 50–60 μm and a maximum particle size of 120 μm and containing fine particles of a particle size not greater than 40 μm in a proportion of at least 12 wt. %.

A reactor 1 was made of pure nickel (JIS standard: NNCP) and had a reaction bed zone 2 having an inner diameter of 54.4 mm and a height of 1,000 mm. Within the reaction bed zone 2, thirteen perforated plates 3 were arranged at intervals of 4 cm. The thickness of the perforated plates 3 was 1 mm. They contained perforations of 4.5 mm across arranged at 9 mm triangular pitches, so that their perforation rate was 22%.

The reaction bed zone 2 was packed with the above catalyst (884.4 g; height of catalyst layer not in operation: 32 cm) and then externally heated to raise its temperature to 370° C. Hydrogen chloride gas and oxygen gas were introduced at 7.38 Nl/min and 3.69 Nl/min respectively into the reaction bed zone 2 by way of a gas inlet 5, a preheating zone 7 and a porcelain-made porous filter (gas diffuser plate) 4 provided in a lower part of the reaction bed zone 2. The feed gases were reacted under a pressure of 0.1–0.3 atm-G in a fluidized state, followed by discharge through a filter 10 and a gas outlet 6. The reactor 1 was also covered with a heater 9 and an insulating jacket 12. In addition, tubes 8,11 are also provided for temperature measurements.

Because of generation of heat, the temperature of the reaction bed zone 2 increased to 390° C.

The gas flowed out of the reactor 1 was collected by a trap connected to an absorption bulb of an aqueous solution of potassium iodide and another absorption bulb of an aqueous solution of caustic soda. Those aqueous solutions were titrated with an aqueous solution of sodium thiosulfate and with hydrochloric acid respectively, whereby unreacted hydrogen chloride and produced chlorine were quantitatively analyzed. The conversion of hydrogen chloride was 54%.

EXAMPLE 2

An experiment was conducted in a similar manner as in Example 1 except that six perforated plates were arranged at intervals of 8 cm. The conversion of hydrogen chloride was 53%.

EXAMPLE 3

An experiment was conducted in a similar manner as in Example 1 except that three perforated plates were arranged at intervals of 16 cm. The conversion of hydrogen chloride was 47%.

EXAMPLE 4

A reactor was made of pure nickel (JIS standard: NNCP) and had a reaction bed zone having an inner diameter of 108 mm and a height of 1,000 mm. Six perforated plates were arranged at intervals of 8 cm in the reaction bed zone. The thickness of the perforated plates was 2 mm. They contained perforations of 4.5 mm across arranged at 9 mm triangular pitches, so that their perforation rate was 22%. An experiment was conducted in a similar manner as in Example 1 except that the reaction bed zone was packed with the catalyst (3516 g; height of catalyst layer not in operation: 32 cm), and hydrogen chloride gas and oxygen gas were introduced at 17.58 Nl/min and 8.79 Nl/min respectively into the reaction bed zone through a porcelain-made porous filter (gas diffuser plate) provided in a lower part of the reaction bed zone and were then reacted at 410° C. in a fluidized state.

The conversion was determined in the same manner as in Example 1. The conversion of hydrogen chloride was found to be 64%.

EXAMPLE 5

An experiment was conducted in a similar manner as in Example 4 except that six perforated plates defining perforations of 9.3 mm across arranged at 23 mm triangular pitches and having a perforation rate of 30% were arranged at intervals of 8 cm. The conversion of hydrogen chloride was 64%.

EXAMPLE 6

An experiment was conducted in a similar manner as in Example 4 except that six perforated plates defining perforations of 4.8 mm across arranged at 10 mm triangular pitches and having a perforation rate of 42% were arranged at intervals of 8 cm. The conversion of hydrogen chloride was 63%.

EXAMPLE 7

An experiment was conducted in a similar manner as in Example 4 except that six perforated plates defining perforations of 9.3 mm across arranged at 17 mm triangular pitches and having a perforation rate of 60% were arranged at intervals of 8 cm. The conversion of hydrogen chloride was 56%.

EXAMPLE 8

Fine silica gel (porosity: 0.75 cc/g) having a particle size of 80–25 mesh was impregnated with a 20 wt. % aqueous solution of chromic anhydride. After drying at 120° C., it was calcined at 350°–400° C. for 2 hours in air.

The above procedure was repeated three times, followed by final calcination at 500° C. for 3 hours to prepare a fine particulate catalyst. As a result of an analysis of the catalyst, it was found to consist of 68 wt. % of chromia and 32 wt. % of silica.

The catalyst was thereafter sifted through JIS standard sieves, thereby obtaining a catalyst having an average particle size (median size) of 50–60 μm. A reactor was made of pure nickel (JIS standard: NNCP) and had a reaction bed zone having an inner diameter of 200 mm and a height of 4,000 mm. Eighteen perforated plates were arranged at intervals of 16 cm in the reaction bed zone. The thickness of the perforated plates was 2 mm. They contained perforations of 4.5 mm across arranged at 11 mm triangular pitches, so that their perforation rate was 30%.

The reaction bed zone was packed with the above catalyst (67.2 kg; height of catalyst layer not in operation: 165 cm). The reactor was externally heated with hot air to raise the temperature of the reaction bed zone to 370° C. Hydrogen chloride gas, oxygen gas and nitrogen gas were introduced at 280 Nl/min, 200 Nl/min and 75 Nl/min respectively into the reaction bed zone through a gas diffuser plate provided in a lower part of the reaction bed zone and having 5 holes of 5 mm across, and were reacted under a pressure of 3 atm-G in a fluidized state. Although the temperature of the reaction bed zone showed a distribution in the direction of the height, it reached 415° C. at the maximum due to generation of heat. The conversion was determined in the same manner as in Example 1. The conversion of hydrogen chloride was found to be 83%.

EXAMPLE 9

An experiment was conducted in a similar manner as in Example 8 except that four perforated plates were arranged at intervals of 1 m. The conversion of hydrogen chloride was 78%.

EXAMPLE 10

An experiment was conducted in a similar manner as in Example 8 except that eighteen perforated plates, which contained three perforations of 50 mm across arranged at a 86 mm triangular pitch and had a perforation rate of 19%, were arranged at intervals of 16 cm. The conversion of hydrogen chloride was 79%.

COMPARATIVE EXAMPLE 1

A catalyst obtained by a similar procedure as in Example 1 was used. A reactor having a reaction bed zone of 54.5 mm in inner diameter and 1000 mm in height, equipped with no perforated plate and made of pure nickel (JIS standard: NNCP) was packed with the above catalyst in the same amount as in Example 1. Similar reaction and operation as in Example 1 were conducted. The conversion of hydrogen chloride was 43%.

COMPARATIVE EXAMPLE 2

A catalyst was obtained in a similar manner as in Example 1. Reaction and operation were conducted in a similar manner as in Example 2 except that a reactor having a reaction bed zone of 108 mm in inner diameter and 1000 mm in height, equipped with no perforated plate and made of pure nickel (JIS standard: NNCP) was packed with the thus-obtained catalyst in the same amount as in Example 1. The conversion was determined in the same manner as in Example 1. The conversion of hydrogen chloride was found to be 53%.

COMPARATIVE EXAMPLE 3

A catalyst was obtained in a similar manner as in Example 8. A reaction was conducted in a similar manner as in Example 8 except that a reactor having a reaction bed zone of 200 mm in inner diameter and 4000 mm in height, equipped with no perforated plate and made of pure nickel (JIS standard: NNCP) was packed with the thus-obtained catalyst in the same amount as in Example 8. Although the temperature of the reaction bed zone shows a distribution in the direction of the height, it reached 415° C. at the maximum due to generation of heat. The conversion was determined in the same manner as in Example 1. The conversion of hydrogen chloride was found to be 74%.

Table 1 shows the conversions of the Examples and Comparative Examples as expressed by converting the molar ratios of oxygen to hydrogen chloride in the feed gases and the hourly feed rates of hydrogen chloride per kg of the respective catalysts to the same standard ratio and rate respectively.

From comparisons in conversion in the following three categories: (1) between Examples 1, 2 and 3 using perforated plates and Comparative Example 1 employing no perforated plates, in all of which the molar ratio of oxygen to hydrogen chloride was 0.5 and the hourly feed rate of hydrogen chloride was 500 Nl per kg of the catalyst, (2) between Examples 4, 5, 6 and 7 using perforated plates and Comparative Example 2 employing no perforated plates, in all of which the molar ratio of oxygen to hydrogen chloride was 0.5 and the hourly feed rate of hydrogen chloride was 300 Nl per kg of the catalyst, and (3) between Examples 8, 9 and 10 using perforated plates and Comparative Example 3 employing no perforated plates, in all of which the molar ratio of oxygen to hydrogen chloride was 0.7 and the hourly feed rate of hydrogen chloride was 250 Nl per kg of the catalyst, it is appreciated that in all the categories, the conversions of the Examples involving the use of the reactors equipped with the perforated plates are better. As is readily understood from the foregoing, the present invention is extremely useful when practiced industrially.

TABLE 1

| Example | Perforation rate | $O_2$/HCl molar ratio | HCl feed, Nl/kg - catalyst · hr | Conversion (%) |
| --- | --- | --- | --- | --- |
| Ex. 1 | 22 | 0.5 | 500 | 54 |
| Ex. 2 | 22 | 0.5 | 500 | 53 |
| Ex. 3 | 22 | 0.5 | 500 | 47 |
| Ex. 4 | 22 | 0.5 | 300 | 64 |
| Ex. 5 | 30 | 0.5 | 300 | 64 |
| Ex. 6 | 42 | 0.5 | 300 | 63 |
| Ex. 7 | 60 | 0.5 | 300 | 56 |
| Ex. 8 | 30 | 0.7 | 250 | 83 |
| Ex. 9 | 30 | 0.7 | 250 | 78 |
| Ex. 10 | 19 | 0.7 | 250 | 79 |
| Comp. Ex. 1 | 19 | 0.5 | 500 | 43 |
| Comp. Ex. 2 | 19 | 0.5 | 300 | 53 |
| Comp. Ex. 3 | 19 | 0.7 | 250 | 74 |

We claim:

1. A process for producing chlorine by reacting a feed gas comprising hydrogen chloride and oxygen in the presence of a catalyst composed of chromium oxide as a principal component, which comprises using a fluidized bed reactor equipped at vertical intervals not greater than 100 cm with a plurality of perforated horizontal plates having a perforation orate of 10-60% in a reaction zone in which the catalyst is fluidized in operation, said reaction zone being above a gas diffuser plate, wherein
   (1) the average particle size of said catalyst is 40-100 μm, the maximum particle size does not exceed 200 μm and particles having a particle size of 40 μm or smaller account for at least 10 wt. % and said catalyst is used in an amount such that the height of the catalyst layer is at least 0.1 m when the reactor is not in operation;
   (2) the molar ratio of oxygen to hydrogen chloride in said feed gas is at least 0.25;
   (3) said feed gas is charged at an hourly rate of 200–1800 Nl, in terms of hydrogen chloride, per kg of said catalyst;
   (4) the superficial velocity, at which said feed gas flows through the reactor, is maintained at 0.1–1.0 m/sec;
   (5) said reacting is carried out at a temperature of 350° to 450° C. and at a pressure which is at least atmospheric;
   (6) said reactor is made of nickel and contains 1 wt. % or less of iron;
   (7) the area of each perforation of said perforated plates is less than or equal to 20 cm²; and
   (8) the diameter of each perforation is larger than the thickness of said perforated plates.

2. The process as claimed in claim 1, wherein the catalyst has been prepared by calcining chromium hydroxide which was in turn obtained by causing a chromic (III) salt to precipitate with a basic compound.

3. The process as claimed in claim 1, wherein the catalyst has been obtained by causing a silicon oxide carrier to carry 20-80 wt. % of chromic oxide as chromia ($Cr_2O_3$) in accordance with an immersion process comprising:

(a) applying chromic anhydride ($Cr_2O_3$) or a water soluble chromium salt to a carrier of silicon oxide by dipping the same into an aqueous solution of the water soluble chromium salt or chromic anhydride;

(b) drying and calcining the thus-treated carrier, wherein said calcining is effected at about 300° to 400° C. for about 1 to 2 hours;

(c) repeating steps (a) and (b) for a number of times until 20-80 wt. % of chromia is supported on the silicon oxide; and (d) further calcining said supported chromia at about 400° C.–600° C. for several hours.

* * * * *